United States Patent
Greene et al.

(10) Patent No.: US 9,372,690 B2
(45) Date of Patent: Jun. 21, 2016

(54) ANALYSIS OF DATA INTEGRATION JOB

(71) Applicant: International Business Machines Corporation, Armonk, NY (US)

(72) Inventors: Lawrence A. Greene, Plainville, MA (US); Eric A. Jacobson, Arlington, MA (US); Yong Li, Newton, MA (US); Xiaoyan Pu, Chelmsford, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/475,707

(22) Filed: Sep. 3, 2014

(65) Prior Publication Data
US 2016/0062767 A1   Mar. 3, 2016

(51) Int. Cl.
*G06F 9/44* (2006.01)
*G06F 9/46* (2006.01)

(52) U.S. Cl.
CPC ... *G06F 8/75* (2013.01); *G06F 9/46* (2013.01)

(58) Field of Classification Search
CPC ........................................................ G06F 8/75
USPC ........................................................ 717/123
See application file for complete search history.

(56) References Cited

U.S. PATENT DOCUMENTS

| 7,299,216 | B1 | 11/2007 | Liang et al. | |
|---|---|---|---|---|
| 7,890,309 | B2 | 2/2011 | Bhaskaran et al. | |
| 8,400,458 | B2 | 3/2013 | Wu et al. | |
| 2005/0044097 | A1* | 2/2005 | Singson et al. | 707/102 |
| 2009/0089078 | A1* | 4/2009 | Bursey | 705/1 |
| 2011/0004622 | A1* | 1/2011 | Marson | 707/770 |
| 2011/0246415 | A1* | 10/2011 | Li et al. | 707/602 |
| 2012/0089562 | A1* | 4/2012 | Deremigio et al. | 707/602 |
| 2012/0197681 | A1* | 8/2012 | Marrelli et al. | 705/7.27 |
| 2012/0209847 | A1 | 8/2012 | Rangan | |
| 2012/0209853 | A1 | 8/2012 | Desai et al. | |
| 2012/0290527 | A1* | 11/2012 | Yalamanchilli | 707/602 |
| 2012/0330911 | A1* | 12/2012 | Gruenheid et al. | 707/694 |
| 2013/0031117 | A1* | 1/2013 | Mandelstein et al. | 707/758 |
| 2013/0041837 | A1 | 2/2013 | Dempski et al. | |
| 2013/0103734 | A1 | 4/2013 | Boldyrev et al. | |
| 2013/0262519 | A1 | 10/2013 | Diner et al. | |
| 2013/0268916 | A1 | 10/2013 | Misra et al. | |

FOREIGN PATENT DOCUMENTS

| EP | 2079020 | 7/2009 |
|---|---|---|
| EP | 2650780 | 10/2013 |

OTHER PUBLICATIONS

List of IBM Patents or Patent Applications Treated as Related, Apr. 28, 2015.

* cited by examiner

*Primary Examiner* — Ryan Coyer
(74) *Attorney, Agent, or Firm* — Susan Murray; SVL IPLaw Edell, Shapiro & Finnan, LLC

(57) ABSTRACT

A request for analysis of a data integration job is received that includes one or more features and criteria for the analysis. Each feature is extracted from a job model representing the job by invoking a corresponding analytical rule for each feature. The analytical rule includes one or more operations and invoking the analytical rule performs the operations to analyze one or more job components associated with the corresponding feature as represented in the job model and to extract information pertaining to that feature.

12 Claims, 14 Drawing Sheets

Each plugin implements the following interface:
```
/**
 * Base Feature Plugin interface
 *
 * @author yli
 *
 */
public interface IFeature
{
    /**
     * For a given JobModel, check if this job contains current feature or not. A feature is defined as
     * a specific condition that leads to user's interest, i.e.: compatibility concern, or specific usage of
     * a particular product function.
     *
     * Return true if this feature is found, false otherwise
     *
     * @param jobModel
     * @return
     */
    public boolean check(JobModel jobModel);

/**
     * Return the feature name of current plugin
     * @return
     */
    public String getFeatureName();

/**
     * Return the description of feature implemented in the plugin
     * @return
     */
    public String getFeatureDescription();

/**
     * Return resolution of help text if one exists
     * @return
     */
    public String getResolution();
}
```

ANALYSIS OF DATA INTEGRATION JOB

BACKGROUND

1. Technical Field

Present invention embodiments relate to data integration, and more specifically, to design analysis of data integration jobs.

2. Discussion of the Related Art

Data integration is a complex activity that affects every part of an organization. Today, organizations face a wide range of information-related challenges: varied and often unknown data quality problems, disputes over the meaning and context of information, managing multiple complex transformations, leveraging existing integration processes rather than duplicating effort, ever-increasing quantities of data, shrinking processing windows, and the growing need for monitoring and security to ensure compliance with national and international law.

Current data integration platforms don't have analytical tools that provide analytical information across an extract-transform-load (ETL) system to end users that address a range of issues, including the following examples:

Issue 1: After upgrading the product from an earlier release to the latest version, users may wish to know whether any item listed in the release note and/or the technical note have an impact in the upgrade.

Issue 2: After installing a software patch, alternatively referred to herein as fix packs, users may note a change in behavior due to some defect fixes. Accordingly, the users may want to know if this change impacts the current process environment and, if so, how extensive the impact may be.

Issue 3: After installing the product on a new server with a newer C++ compiler, and determining for example, that columns containing floating point values do not return expected values, the user may want to know how many ETL jobs are affected by this change.

Issue 4: When a large number of ETL jobs are present in the system, e.g., over 20000 jobs, the user may want to know how many of those jobs would be affected if an environment variable is removed or updated.

Issue 5: In an environment with numerous ETL developers building different ETL applications for different lines of business, the user may want to know how to enforce coding standards, naming conventions, and common design patterns.

Issue 6: When a design defect is known to exist in a job template used by many developers for different needs, the user may want to know which jobs, if any, that were derived from the template contain the defect.

Currently, to address issues 1-4, the user would have to run all the tests, analyze the test results, and review each failed test. This approach actually works for limited failure cases, but is not practical if there is a large number of failing jobs. The approach does not work at all if a job executes successfully, but produces incorrect data. This is especially problematic if the incorrect data are consumed by other jobs. When this happens, the user has to trace back job by job, stage by stage to find the root cause.

A common solution adopted by many users for issue 5 is to pay consulting services to review job designs, share best practices, construct project structures, and develop job templates, etc.

For issue 6, some users keep notes on which template is used by which job design. Some users rely on the source control techniques to track the history of a job so that a root from which a particular job evolved can be located. Some users add annotations to the job design, and can only correlate one job to the other by reading and analyzing those annotations. Again, these approaches are tedious and inefficient, almost impractical if a large number of jobs involved.

SUMMARY

According to one embodiment of the present invention, a request for analysis of a data integration job is received that includes one or more features and criteria for the analysis. Each feature is extracted from a job model representing the job by invoking a corresponding analytical rule for each feature. The analytical rule includes one or more operations and invoking the analytical rule performs the operations to analyze one or more job components associated with the corresponding feature as represented in the job model and to extract information pertaining to that feature.

BRIEF DESCRIPTION OF THE SEVERAL VIEWS OF THE DRAWINGS

Generally, like reference numerals in the various figures are utilized to designate like components.

FIGS. 5A-5B are exemplary code files in which features of the present general inventive concept can be embodied.

DETAILED DESCRIPTION

Figure 1:
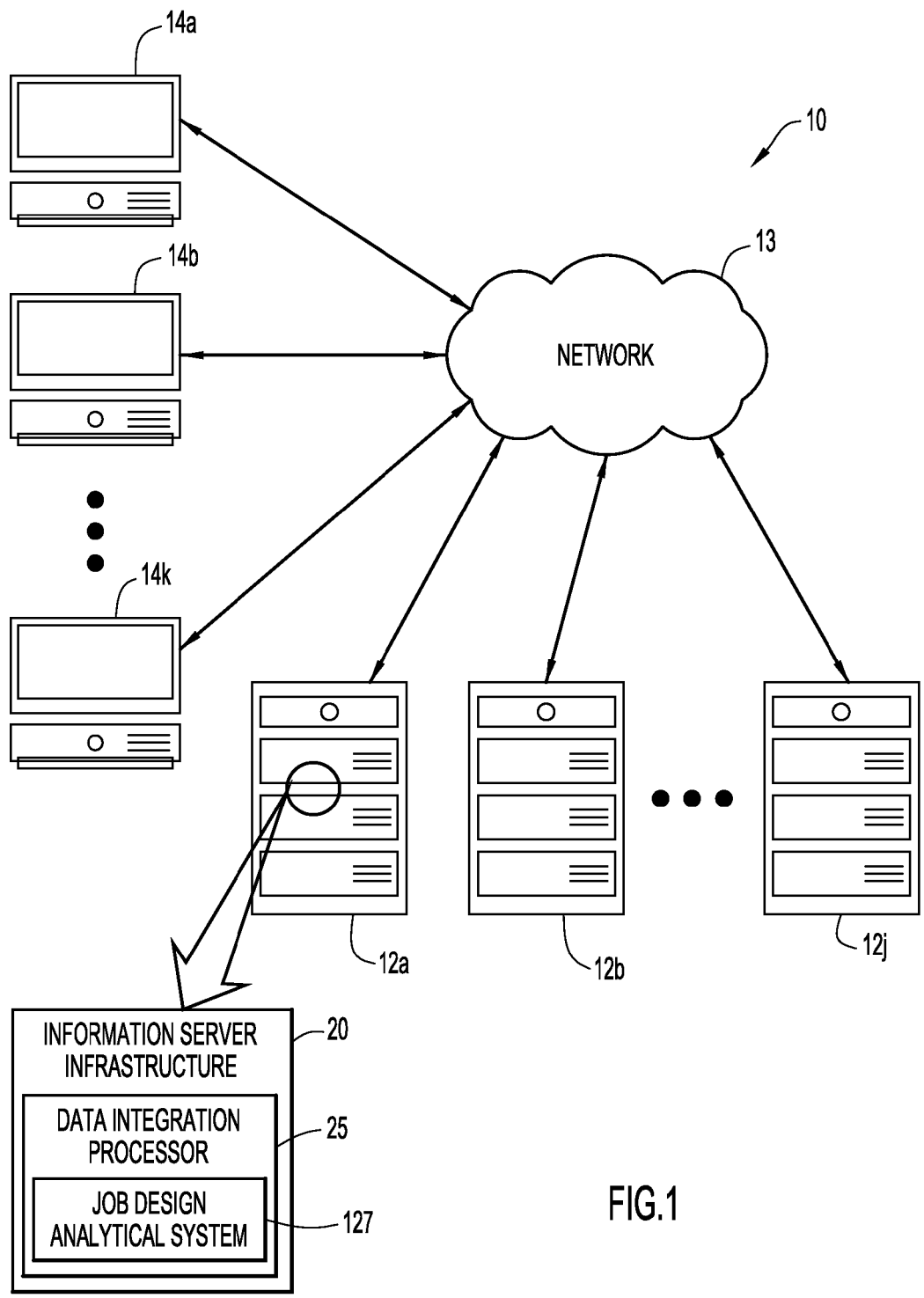
FIG. 1 illustrates an enterprise infrastructure in which the present general inventive concept can be embodied.

The present inventive concept is best described through certain embodiments thereof, which are described in detail herein with reference to the accompanying drawings, wherein like reference numerals refer to like features throughout. It is to be understood that the term invention, when used herein, is intended to connote the inventive concept underlying the embodiments described below and not merely the embodiments themselves. It is to be understood further that the general inventive concept is not limited to the illustrative embodiments described below and the following descriptions should be read in such light.

Additionally, the word exemplary is used herein to mean, "serving as an example, instance or illustration." Any embodiment of construction, process, design, technique, etc., designated herein as exemplary is not necessarily to be construed as preferred or advantageous over other such embodiments An example environment for use with present invention embodiments is illustrated in FIG. 1 as enterprise infrastructure 10. As is illustrated, the environment includes one or more server systems 12a-12j, representatively referred to herein as server system(s) 12, and one or more client or end-user systems 14a-14k, representatively referred to herein as client system(s) 14. Server systems 12 and client systems 14 may be remote from each other and may communicate over a network 13. Network 13 may be implemented through any number of suitable communications media, e.g., metallic conductors, optical fiber, air, etc. using one or more signaling techniques and possibly in accordance with one or more standardized communication protocols, e.g., Internet Protocol (IP), Transport Control Protocol (TCP), User Datagram Protocol (UDP), etc. Network 13 may be supported by suitable hardware components to implement wide area networks (WAN), local area networks (LAN), internets, intranets, etc. Alternatively, server systems 12 and client systems 14 may be sufficiently local to each other to communicate with each other through direct or line-of-sight techniques, e.g., wireless radio links, fiber-less optical links, etc. In certain implementations, services and functionality of server systems 12 and those of client systems 14 may be performed by common circuitry and shared computational resources in a device such as a workstation.

Server systems 12 and client systems 14 may be implemented by any conventional or other computer systems preferably equipped with a display or monitor, a base (e.g., including at least one processor (not illustrated), one or more memories (not illustrated) and/or internal or external network interfaces or communications devices, e.g., modem, network cards, etc. (not illustrated), optional input devices, e.g., a keyboard, mouse or other input device (not illustrated), and any commercially available, open-source and custom software, e.g., operating system, server/communications software, browser/interface software, etc.

One or more processors and one or more storage devices of server systems 12 may be configured or otherwise constructed to implement an information server infrastructure (ISI) 20 by which enterprise information from heterogeneous data sources utilizing differing conceptual, contextual and typographical representations is collected, stored and managed in a unified data framework. ISI 20 may incorporate a data integration processor 25 that implements a job design analytical system (JDAS) 127 in embodiments of the present invention.

A "job," as used throughout this disclosure, refers to batch execution of a series of data integration tasks. The examples that follow are directed to extract-transform-load (ETL) data integration jobs; however, it is to be understood that the present invention is not limited to any particular data integration paradigm.

Figure 2:
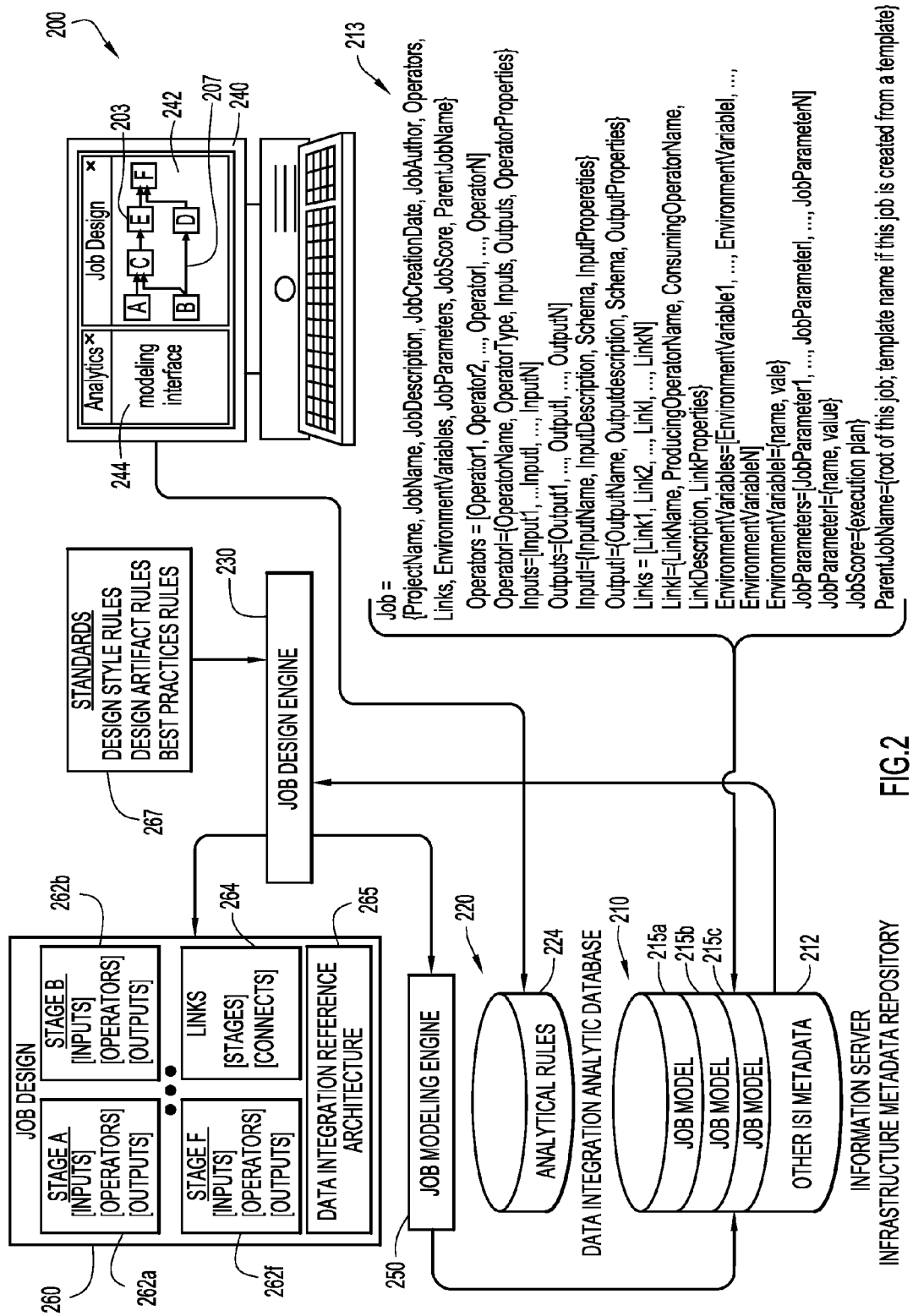
FIG. 2 is a diagram of a job design process in context of exemplary components of a data integration processor in which the present general inventive concept can be embodied.

FIG. 2 is a diagram of a job design process 200 in context of exemplary components of JDAS 127. As those skilled in information technology (IT) will recognize and appreciate, ISI 20 is deployed incrementally and over the time ISI 20 evolves, metadata, representatively illustrated at metadata 212, may be generated, refined and stored in information server metadata repository 210, referred to herein simply as metadata repository 210. Processes performed by and data flows occurring in ISI 20 can be represented through metadata 212 stored in metadata repository 210.

Any data integration flow can be modeled as a set of stages and a set of links. A stage 203 may represent a data source, a data target, or a data processing unit and a link 207 may represent the data flow direction.

In certain embodiments, a designer workstation 240 may include a job design interface 242 through which an ETL job may be designed into a job design 260. Job design 260 may be a set of instructions compiled by a job design engine 230 that specifies stages 262a-262f, the links 264 that define processes and data flow through ISI 20, as represented by data integration reference architecture 265. Reference architecture 265 represents the evolved ISI 20 discussed above.

In certain embodiments of the present invention, designer workstation 240 implements a job analytics interface 244 that runs concurrently with job design interface 242. As a particular job is being designed through job design interface 242, a metadata representation of the job design, referred to herein as a job model and representatively illustrated at job models 215a-215c and representatively referred to herein as job model(s) 215, is created by job modeling engine 250. A job model 215 may be distinguished by the following attributes: Job={ProjectName, JobName, JobDescription, JobCreationDate, JobAuthor, Operators, Links, EnvironmentVariables, JobParameters, JobScore, ParentJobName},
and each of these attributes may be further defined by metadata structures, such as those illustrated in FIG. 2 at job model metadata database 213. It is to be understood that the foregoing set of attributes is merely an example; job models can be distinguished by fewer or a greater number of attributes.

In certain embodiments, job model 215 implements suitable APIs for navigating through each aspect of the job as represented in job model database 213, such as JobName, JobDescription, Operators, Operator Property, Operator Input Schemas, Output Schemas, etc. As illustrated in FIG. 2, job models 215 may be stored in metadata repository 210.

Job designs are typically constrained by rules specified by various standards 267. For example, design style rules specify annotation rules and naming convention rules, design artifact rules specify data type normalization, stage type normalization, null handling, data conversion, and data truncation, and best practices rules specify rules on job complexity and project structure. Additional rules include data type rules for finding columns of the same data type, stage type rules for finding stages of the same type, null handling rules for finding null related function calls, and conversion rules for tracking data conversion calls.

Best practices rules ensure that the data integration framework is manageable and efficient. The job complexity rule ensures that a job design conforms to pre-defined best practices, such as: the number of operators in the job should not exceed the preconfigured threshold, the number of input links to any operator should not exceed the preconfigured threshold, the number of output links from any operator should not exceed preconfigured threshold, if two or more sections of the data flow are similar, they should be promoted to a local/shared container so that the logic can be simplified. The project structure rule ensures that a project is defined clearly in a minimally-sized unit for easy navigation, such as: the number of folders in the project should not exceed the preconfigured threshold, the number of sub folders in the any folder should not exceed the preconfigured threshold, the number of jobs in any folder should not exceed preconfigured threshold.

The job correlation rule identifies relationships among jobs, such as: jobs evolved from the same template, jobs utilizing the same shared containers, jobs sharing the same table definitions, jobs chained through datasets/filesets/files/database tables, jobs using the same environment variables, jobs having the same parameters, jobs using a particular operator.

Through analytic interface 244, the designer can specify a severity level for each rule, which is recorded if adherence to that rule cannot be validated. Exemplary severity levels include, for example, critical, error, warning, and ignore. Analytical rules and corresponding severity settings configured through analytics interface 244, representatively illustrated at analytical rules 224, may also be persisted into DIAD 220.

Figure 3:
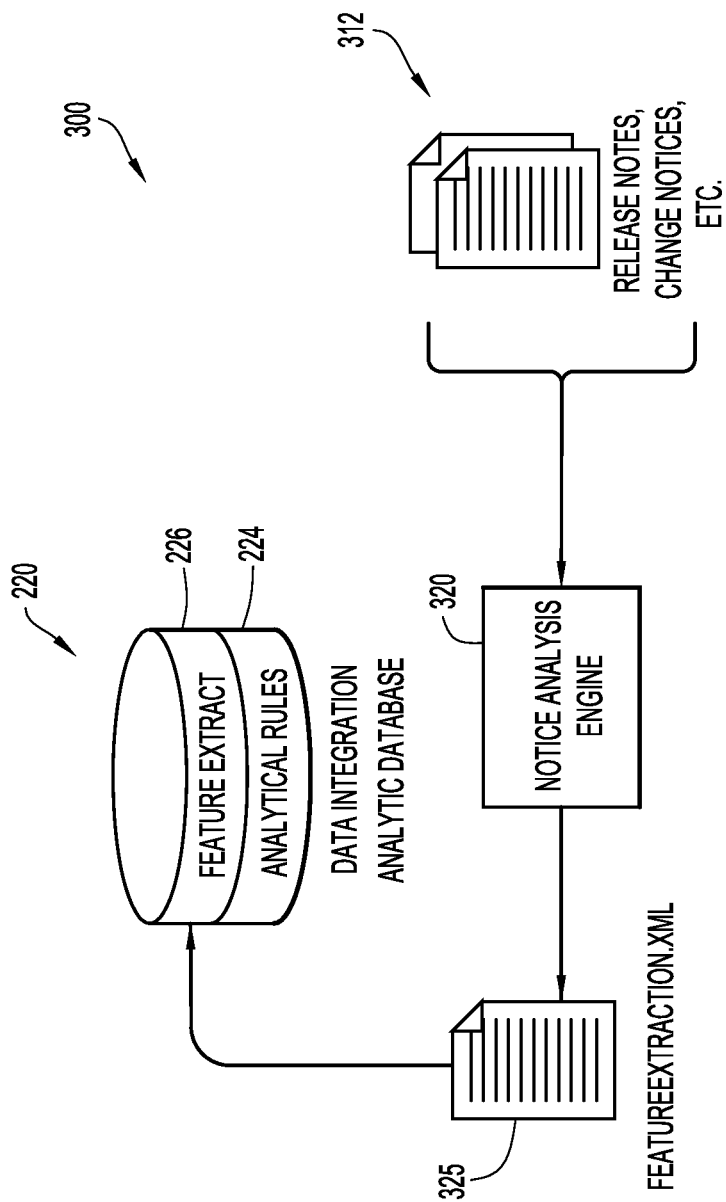
FIG. 3 is a diagram illustrating operations that may be performed prior to job design analysis in which the present general inventive concept can be embodied.

FIG. 3 is a diagram illustrating operations that may be performed prior to job design analysis in context of exemplary components of JDAS 127. New IT system releases, software patches, updates and the like are typically specified in release notes, technical memoranda, change notices, and so on, representatively illustrated at notices 312. Notices 312 may be provided to a notice analysis engine 320, by which relevant features for analysis are extracted from notices 312. Additionally or alternatively, each product release may provide a set of built-in features for the user to explore, including, but not limited to: annotation at job/stage/link level, naming convention at job/stage/link level, data type normalization, stage type normalization, null handling, data conversion, data truncation, job complexity, project structure, and job correlation.

The user may select which features to explore in the analysis and the analytical rules to be applied through, for example, job analytics interface 244. The selected features and job design analysis criteria may be established in a file, e.g., FeatureExtraction.xml file 325, which may be stored in DIAD 220 at storage location 226.

Figure 4:
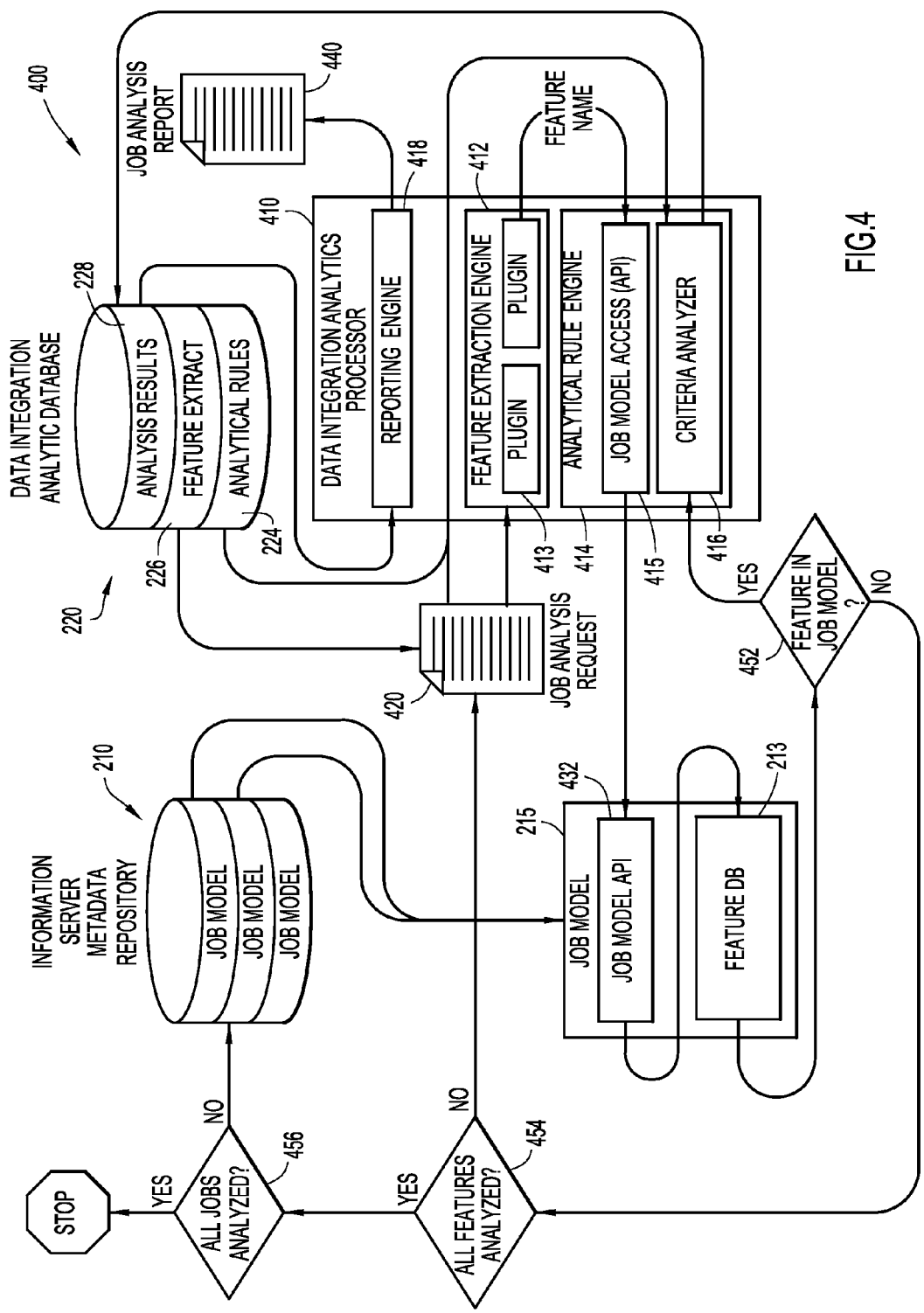
FIG. 4 is a job design analysis process in context of exemplary components of a data integration processor in which the present general inventive concept can be embodied.

FIG. 4 is a job design analysis process in context of exemplary components of JDAS 127. JDAS 127 may implement a data integration analytics processor 410, by which a user can perform job design analysis. The user may select features with various criteria, including, but not limited to, an individual job, all jobs within the same project, all projects within the same engine, all jobs for a specified user, all jobs for a specified user group, jobs sharing portions of a particular name, jobs created after/before a given date, and so on. Job design analysis process 400 is initiated by presenting a job analysis request 420 to feature extraction engine 412 in data integration analytics processor 410. In one implementation, FeatureExtraction.xml 325 is used as job analysis request 420.

Figure 5A:
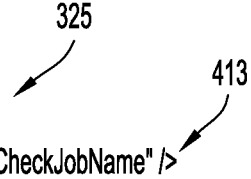

An exemplary FeatureExtraction.xml file 325 is illustrated in FIG. 5A. As illustrated in the figure, FeatureExtraction.xml 325 specifies a set of plugins 413, by which feature extraction engine 412 invokes the analytical rule associated with each feature being analyzed. Each plugin may implement an interface 550 illustrated in FIG. 5B.

Returning to FIG. 4, FeatureExtraction.xml file 325 is provided to feature extraction engine 412 and the plugin for a first feature retrieves the feature name, which may be passed to job model access module 415 in analytical rule engine 414. Job model access module 415 may call functions in job model API 432 and, in response to receiving the feature name, search the job model feature database 213 for the named feature. It is then determined in operation 452 whether the feature is located in the job model and, if so, the feature and its value are passed to criteria analyzer 416 in analytical rule engine 414. Analytical rule engine 414 may retrieve the applicable analytical rules from DIAD 220 and from FeatureExtraction.xml file 325 and the feature is scrutinized against the analytical rules in criteria analyzer 416. The results from criteria analyzer 416 may be stored in DIAD 220, such as at storage location 228. At the end of job analysis process 400, reporting engine 418 in data integration analytics processor 410 retrieves analysis results 228 from DIAD 220 to generate job analysis report 440.

In operation 454, it is determined whether all features have been analyzed and, if not, the next feature is extracted from job analysis request 420. If all features in a job have been analyzed, as determined in operation 454, it is determined in operation 456 whether all job designs have been analyzed. If not, the next job model 215 is retrieved from metadata repository 210 and the features in job analysis request 420 (e.g., FeatureExtraction.xml file 325) are examined for that job model 215. Job design analysis process 400 terminates when all jobs have been analyzed, at which time job analysis report 440 is generated.

Job design analysis may be performed after upgrading to a new release or after applying a fix pack to identify any changes in behavior or compatibility issues. Job design analysis may also be scheduled at regular intervals, e.g. weekly, daily, hourly, or automatically when a job is saved. This helps catch any newly introduced problems as early as possible.

Feature extraction engine 412 may call each feature plugin 413 defined in the FeatureExtraction.xml to perform feature-specific extraction by invoking the corresponding analytical rule in analytical rule engine 414. For example, when CheckJobUseIsNull implements IFeature interface 550, check( ) function may be called in analytical rule engine 414, such as by job model access module 415 and carrying out the following operations: 1) use the job model API 432 to retrieve a list of operators from job model feature database 213; 2) for each operator, determine whether the operator is a transformer and, if not, skip it; 3) if the current operator is determined to be a transformer, then get a list of transformer expressions using the job model API 432; 4) for each expression, determine whether the IsNull construct is used; and 5) if the IsNull construct is used, return TRUE, otherwise continue. These operations can be implemented as part of a CheckIsNull rule.

The foregoing can easily be extended to plugins for any new features. When a new compatibility (or other) issue is identified, a new plugin can be developed to specifically check for the condition of that compatibility issue. This new plugin may be added to a released feature pack. The updated feature pack may then be distributed to customers who may reanalyze the job by the job design analytical system using the updated feature pack to obtain a detailed report indicating what jobs would be impacted by this new compatibility issue.

Reporting engine 418 can produce a detailed report for each job design analysis request. The report lists all the features that have been analyzed and the result corresponding to each feature validation including, but not limited to: jobs using given environment variables, jobs using given job parameters, jobs not following the predefined design style, jobs not following best practices, jobs containing a particular operator, jobs using a specific operator property. Reporting engine 418 may also generate a dashboard view job analysis report 440, such as on job analytics interface 244.

As stated above, users may wish to know whether any item listed in a release note and/or a technical note have an impact in a product upgrade. JDAS 127 in the upgraded release may contain new features and rules to cover release-noted items and tech-noted issues. The user runs JDAS 127 against the entire job design assets, which generates a complete report indicating problems along with recommended solutions. In one example, features that are validated are listed in green; features that fail are listed in red; features that may have potential problems are listed in yellow. The report can help users decide whether or not to upgrade (or apply a patch).

One example, an upgrade may issue data truncation warnings on a per record basis. Correcting data truncation issues can prevent data loss, but may degrade performance. The user may need to know how many jobs have this potential problem so as to evaluate trade-offs with upgrading.

Figure 6:
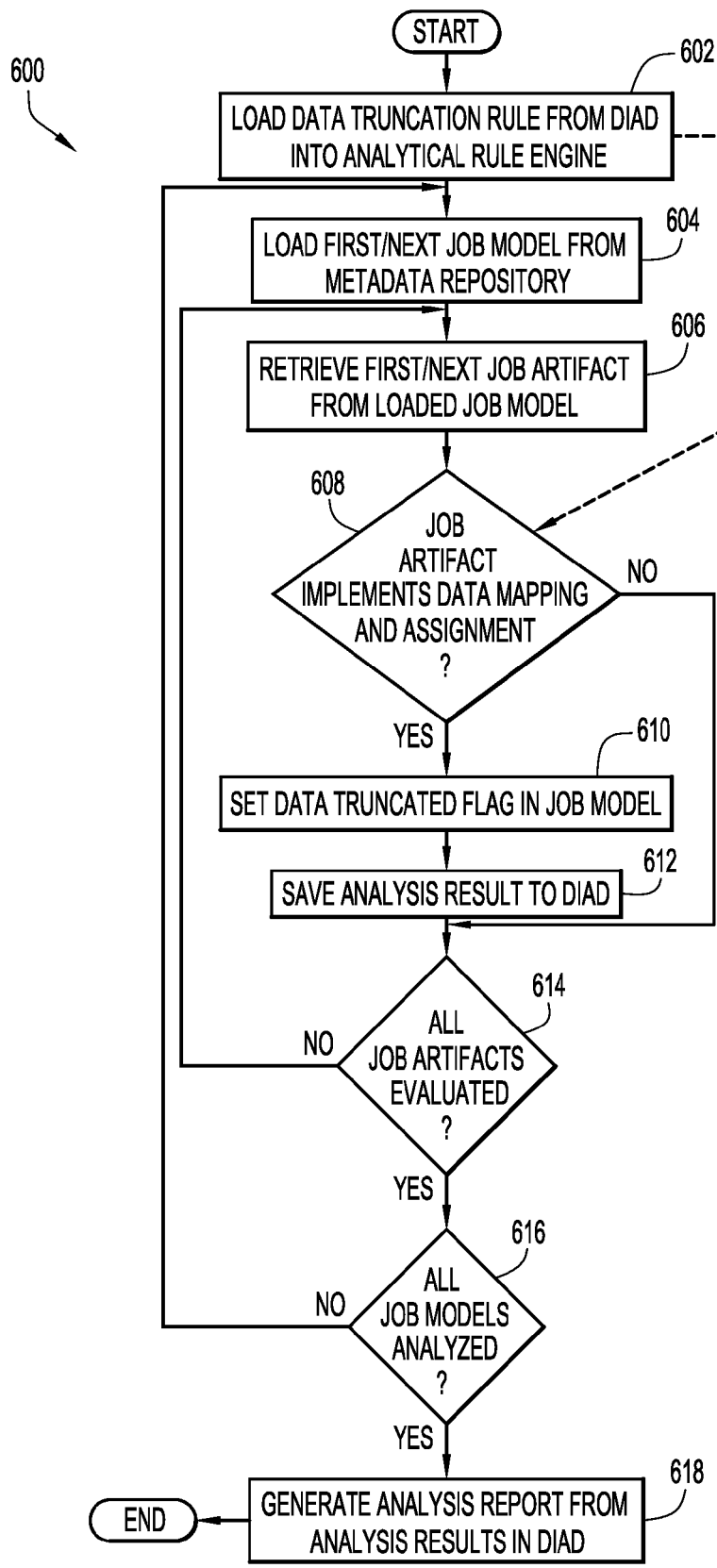
FIG. 6 is a flow diagram by which jobs implementing a data truncation rule evaluation process that can be implemented in embodiments of the present general inventive concept.

FIG. 6 is a flow diagram of exemplary execution logic 600 by which jobs implementing the data truncation rule are reported. In operation 602, the data truncation rule is loaded from the analytical rules stored in DIAD 220. In operation 604, a first job model is loaded from metadata repository 210 and in operation 606, a first job artifact is retrieved from the loaded job model. In operation 608, it is determined whether the retrieved job artifact implements data mapping and assignment that would result in data truncation. If so, process 600 may transition to operation 610, by which a data truncated flag in the loaded job model is set to true. In operation 612, the job analysis results, e.g., an identifier of the job and an indicator that the job is impacted through data truncation, are stored in DIAD 220. Process 600 may then transition to operation 614, by which it is determined whether all job artifacts have been evaluated for data truncation. If all job artifacts have been evaluated, process 600 may transition to operation 616, by which it is determined whether all job models have been analyzed. If so, process 600 transitions to operation 618, by which an analysis report is generated from the analysis results stored in DIAD 220. If, in operation 614, is determined that job artifacts in the loaded job model have yet to be evaluated, process 600 may return to operation 606 and continue from that point. Similarly, if it is determined in operation 616 that job models remain to be analyzed, the analysis of process 600 continues to the next job model, which is loaded in operation 604.

After installing a software patch, alternatively referred to herein as fix packs, users may note a change in behavior due to some defect fixes. Accordingly, the users may want to know whether this change impacts the current process environment and, if so, how extensive the impact may be. The user can enable features in JDAS 127 that evaluate changes in behavior introduced in a particular fix packs. JDAS 127 may analyze all job models and list those jobs that would be impacted by applying the patch along with the severity (e.g. direct impact-critical, indirect impact-warning).

One example is of such change in behavior occurs in a sort replacement change. Suppose that previous versions of the data integration framework issued a warning if the sort keys used by upstream sort operations are different from the keys required by a current stage. The upgraded framework may replace the sort keys in addition to the aforementioned warning.

Figure 7:
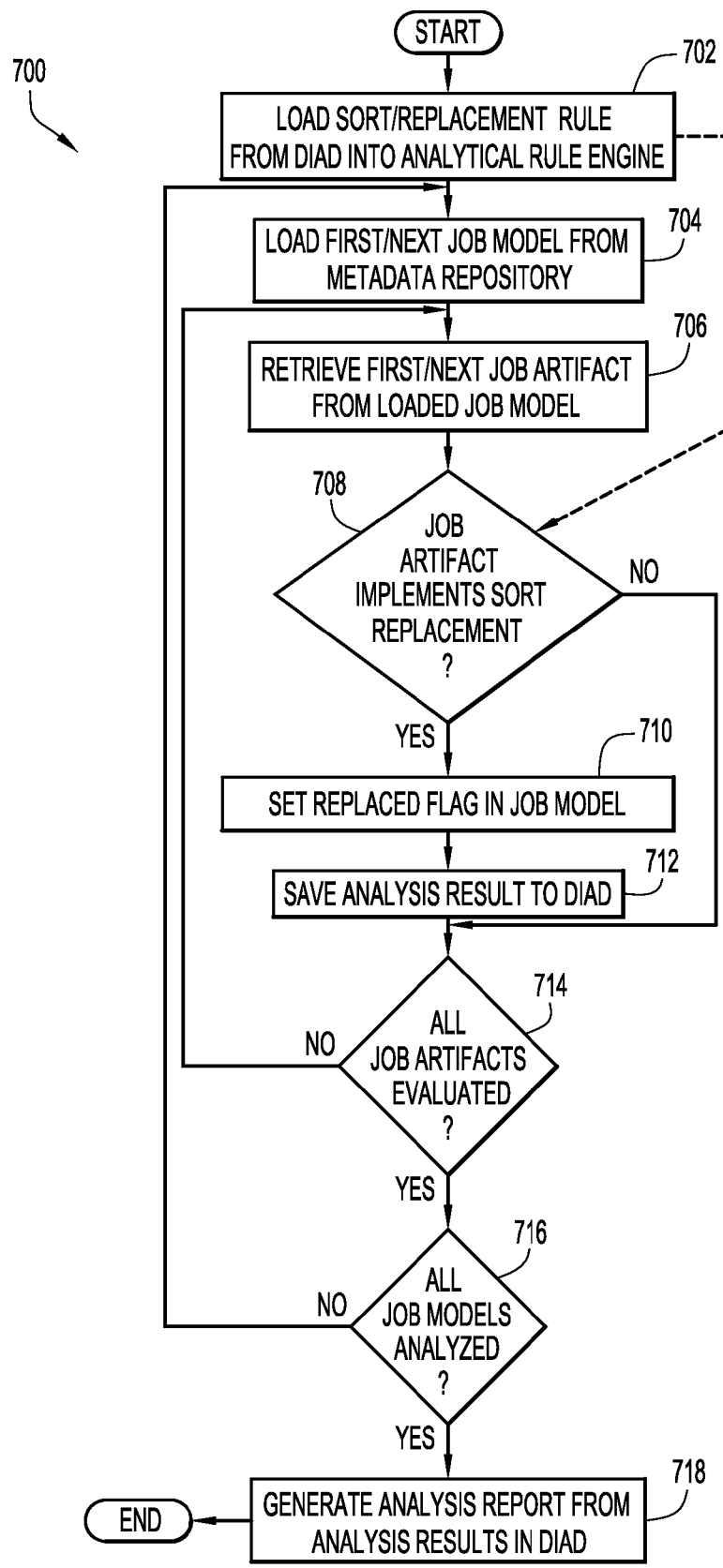
FIG. 7 is a flow diagram of a sort replacement rule evaluation process that can be implemented in embodiments of the present general inventive concept.

FIG. 7 is a flow diagram of exemplary execution logic 700 of JDAS 127 that would evaluate the sort/replacement rule. In operation 702, the sort/replacement rule is loaded from the analytical rules stored in DIAD 220. In operation 704, a first job model is loaded from metadata repository 210 and, in operation 706, a first job artifact is retrieved from the loaded job model. In operation 708, it is determined whether the retrieved job artifact implements sort/replacement. If so, process 700 may transition to operation 710, by which a replaced flag in the loaded job model is set to true. In operation 712, the job analysis results, such as those described above, are stored in DIAD 220. Process 700 may then transition to operation 714, by which it is determined whether all job artifacts have been evaluated for sort/replacement. If all job artifacts have been evaluated, process 700 may transition to operation 716, by which it is determined whether all job models have been analyzed. If so, process 700 transitions to operation 718, by which an analysis report is generated from the analysis results stored in DIAD 220. If, in operation 714, is determined that job artifacts in the loaded job model have yet to be evaluated, process 700 may return to operation 706 and continue from that point. Similarly, if it is determined in operation 716 that job models remained to be analyzed, the analysis of process 700 continues to the next job model, which is loaded in operation 704.

As stated above, users may want to determine, for example, how many ETL jobs contain floating point values that are not returned as expected. The user can select a suitable data type normalization feature to determine what columns in which tables used by what jobs contain values of the floating point type. The user can then change the floating point columns to, for example, decimal columns to maintain accuracy.

Figure 8:
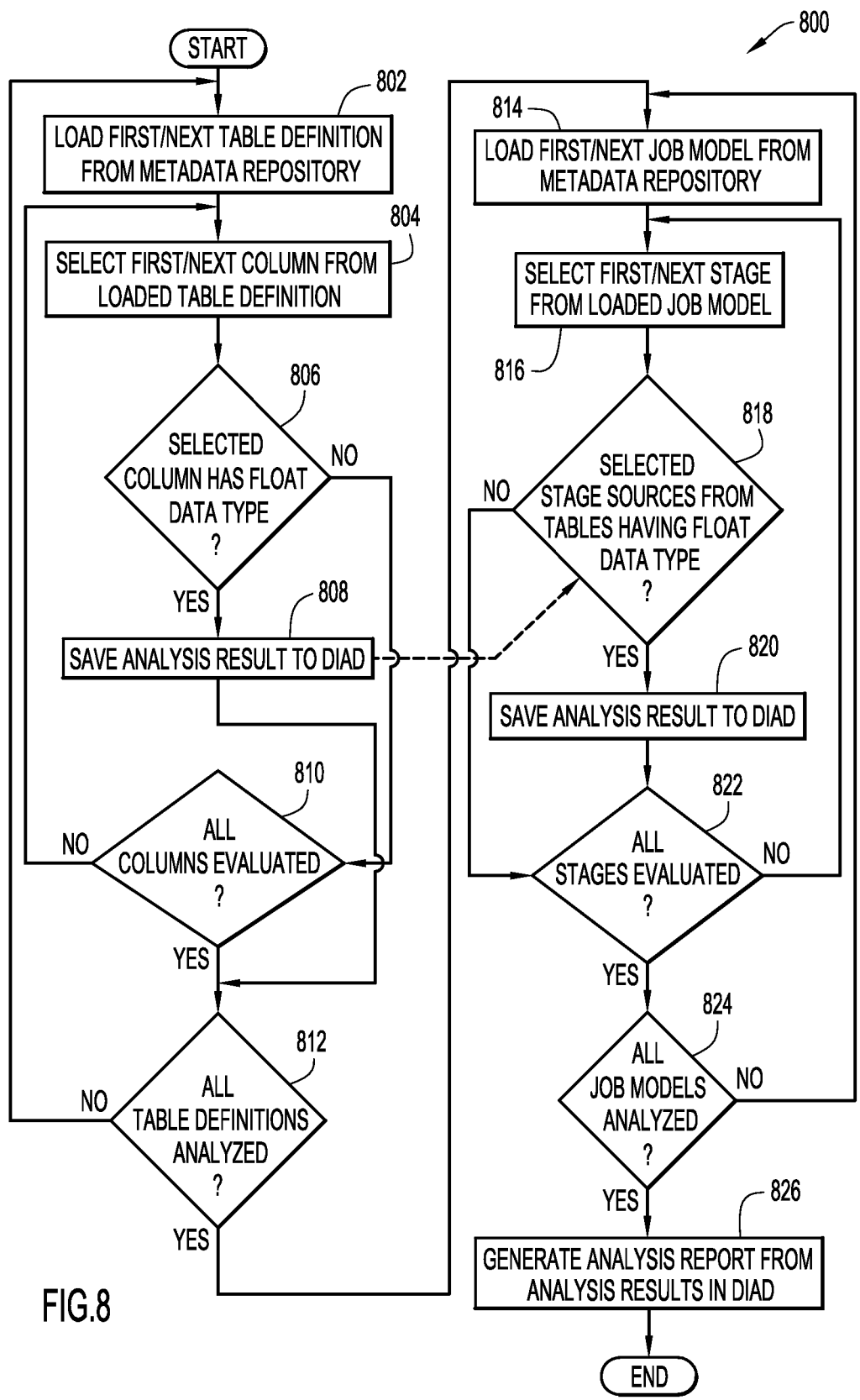
FIG. 8 is a flow diagram of a data type identification rule evaluation process that can be implemented in embodiments of the present general inventive concept.

FIG. 8 is a flow diagram of exemplary execution logic 800 for a data type identification rule. In operation 802, a first table definition is loaded from metadata repository 210 and, in operation 804, a first column is selected from the loaded table definition. In operation 806, it is determined whether the selected column holds floating-point data, e.g., the "float" data type. If so, process 800 transitions to operation 808, by which table analysis results, e.g., an indication that the selected column of the loaded table definition holds floating-point data, are stored in DIAD 220 and process 800 transitions to operation 812, by which it is determined whether all table definitions have been analyzed. If the selected column does not hold floating-point data, as determined in operation 806, process 800 transitions to operation 810, by which it is determined whether all columns in the loaded table definition have been evaluated for floating-point data. If not, process 800 returns to operation 804, by which the next column is selected from the loaded table definition. If all columns have been evaluated, process 800 transitions to operation 812, by which it is determined whether all table definitions have been analyzed. If not, process 800 returns to operation 802 and continues from that point.

If all table definitions have been analyzed for floating point data, as determined in operation 812, process 800 transitions to operation 814, by which a first job model is loaded from metadata repository. In operation 816, a first stage is selected from the loaded job model and, in operation 818, it is determined whether the selected stage is sourced or otherwise receives input from a table identified as having floating-point data. If so, process 800 may transition to operation 820, by which the analysis result, e.g., an indication that the selected stage of the loaded job model operates on floating-point data, is stored in DIAD 220; otherwise, process 800 transitions to operation 822, by which it is determined whether all stages in the loaded job model have been evaluated. If stages remain to be evaluated, as determined in operation 822, process 800 returns to operation 816, by which the next stage is selected from the loaded job model. If all stages have been evaluated, as determined in operation 822, process 800 transitions to operation 824, by which it is determined whether all job models have been analyzed. If not, process 800 returns to operation 814 and continues from that point. If all job models have been analyzed, as determined in operation 824, process 800 transitions to operation 820, by which an analysis report is generated from the analysis results stored in DIAD 220. The analysis report may identify the table columns that would contain floating-point data for data integration and the job stages by which each table column is processed in data integration.

To determine how many of a large number of ETL jobs would be affected if an environment variable is removed or updated, the user can select one of the job correlation features implemented by an embodiment of JDAS 127 to find out what jobs will be impacted if one particular environment variable is changed.

Figure 9:
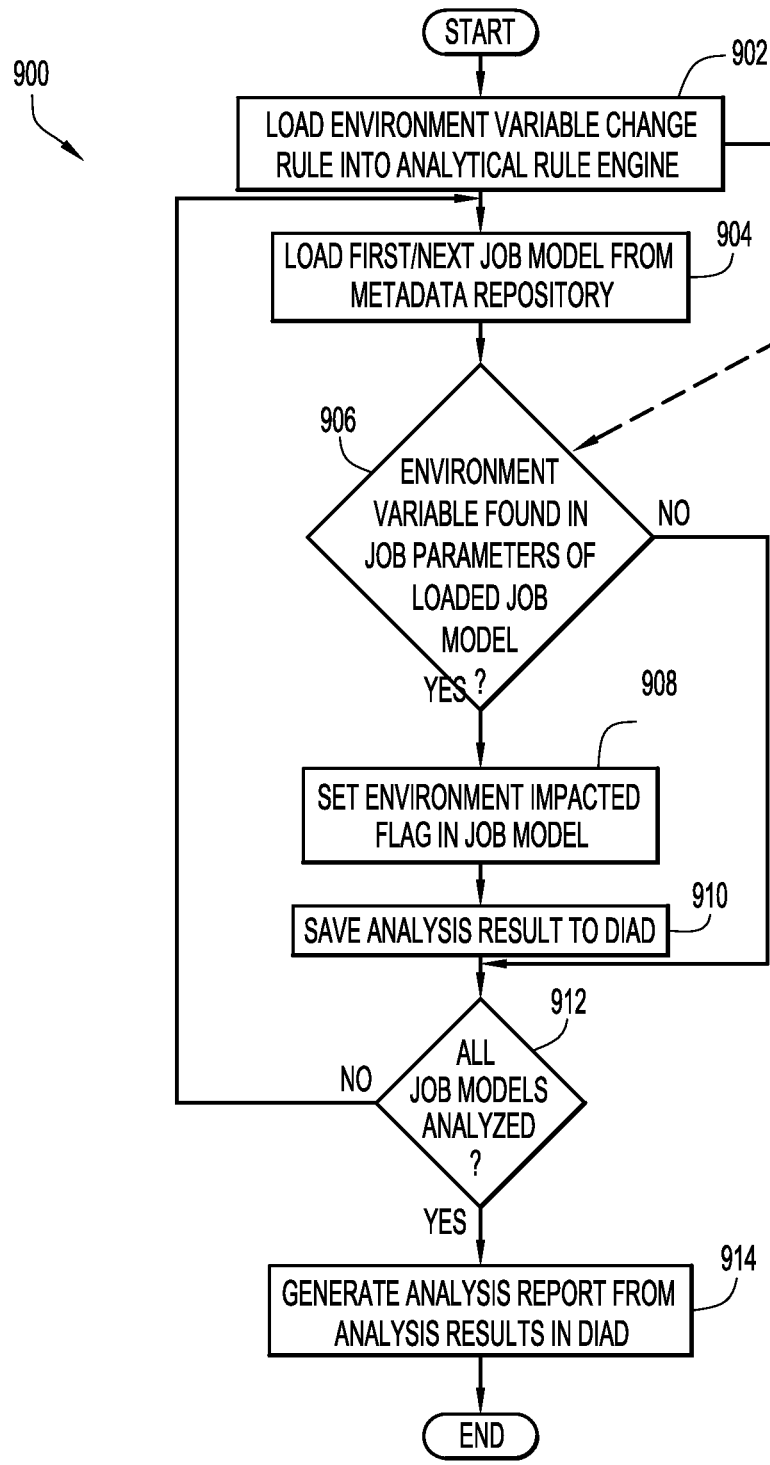
FIG. 9 is a flow diagram of an environment variable change rule evaluation process that can be implemented in embodiments of the present general inventive concept.

FIG. 9 is a flow diagram of exemplary execution logic 900 for an environment variable change rule. In operation 902, the environment variable change rule is loaded from the analytical rules stored in DIAD 220. In operation 904, a first job model is loaded from metadata repository 210 and in operation 906, it is determined whether the environment variable is contained in the job parameters of the loaded job model. As used herein, a job parameter is a processing variable that can be used at various points in a job design and overridden or otherwise assigned a value (e.g., paths, file names, database connection information, or job logic) when the job is executed in order to dynamically influence the processing of the job. If the environment variable is not located in the job parameters of the loaded job, process 900 transitions to operation 912, by which it is determined whether all job models have been analyzed against the environment variable change rule. If all job models have been analyzed, process 900 may transition to operation 914, by which an analysis report is generated from the analysis results stored in DIAD 220; otherwise, process 900 returns to operation 904, by which the next job model is loaded from metadata repository 210. If the environment variable is found in the loaded job model, as determined in operation 906, an environment impacted flag in the job model is set to true and, in operation 910, the job analysis results are stored in DIAD 220.

To enforce coding standards in an environment with numerous ETL developers building different ETL applications for different lines of business, the user can select, for example, best practices features and configure the JDAS 127 to run on a daily basis across the entire development environment to catch any design issues. The user may also configure JDAS 127 to perform job analysis every time a job is compiled. Some example criteria that may be evaluated include: naming convention, e.g., whether a name starts with the required prefix, contains a project code, creates a timestamp, version number, etc., annotation existence, total number of stages in the flow not exceeding a threshold, the total number of jobs in the project not exceeding a threshold, flag debugging environment variables or tracing mode, if any. A coding standard score may be computed based on the number of criteria met versus the total number of coding criteria evaluated. A value of one (1) indicates that the job design meets all the pre-configured coding standards.

Figure 10:
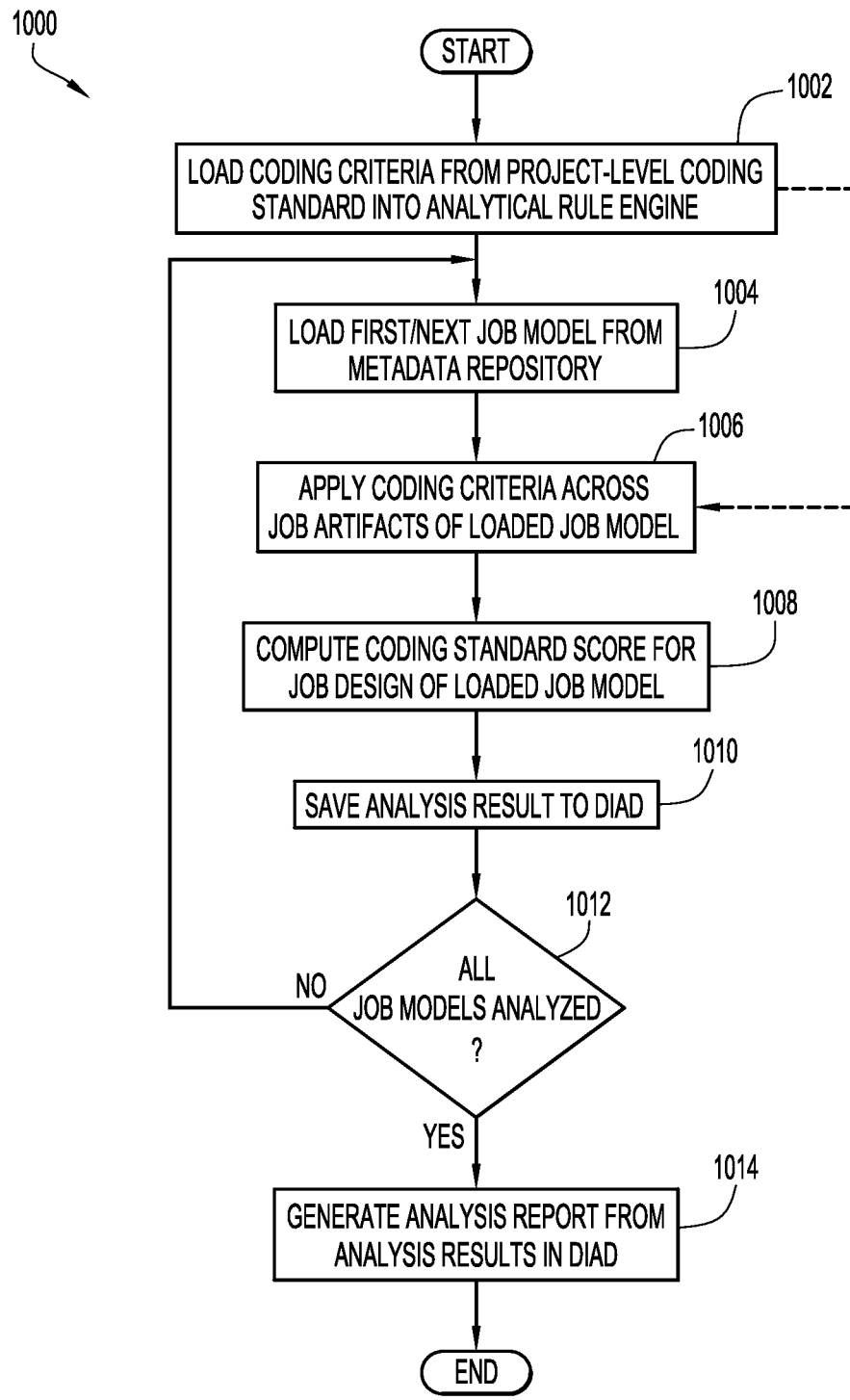
FIG. 10 is a flow chart of a project-level coding standard job analysis process that can be implemented in embodiments of the present general inventive concept.

FIG. 10 is a flow chart of a project-level coding standard job analysis process 1000. In operation 1002, coding criteria is loaded from the project-level coding standard in the analytical rules stored in DIAD 220. In operation 1004, a first job model is loaded from metadata repository 210. In operation 1006, the job artifacts of the loaded job model are evaluated against the coding criteria retrieved from the project-level coding standard. In operation 1008, a coding standard score is computed, such as described above and, in operation 1010, the computed score is stored as job analysis results in DIAD 220. In operation 1012, it is determined whether all job models have been analyzed. If not, the analysis of process 1000 continues to the next job model, which is loaded in operation 1004. If all job models have been analyzed against the project-level coding criteria, process 1000 transitions to operation 1014, by which an analysis report is generated from the analysis results stored in DIAD 220.

Figure 11:
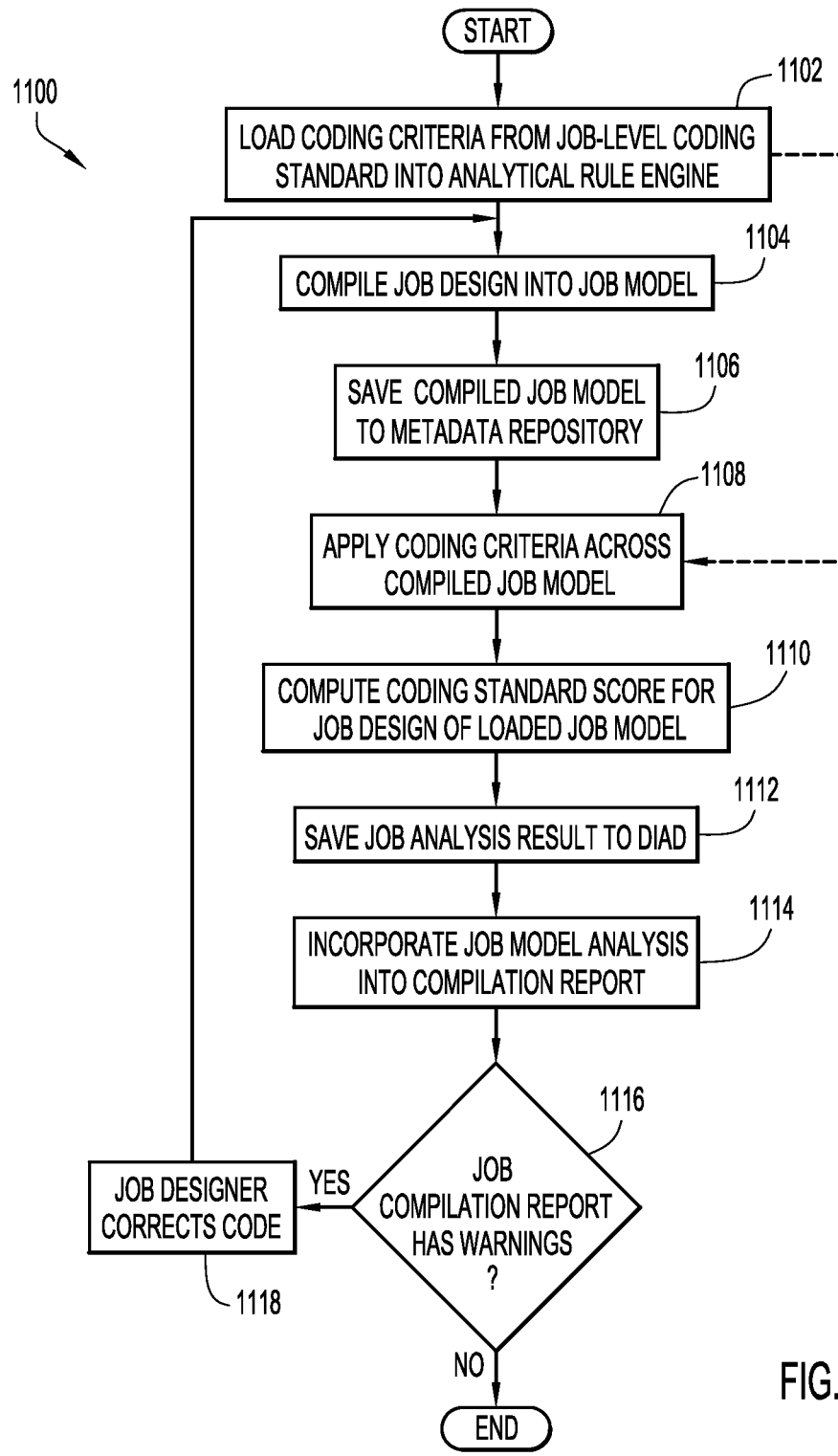
FIG. 11 is a flow chart of a job-level coding standard job analysis process that can be implemented in embodiments of the present general inventive concept.

FIG. 11 is a flow chart of a job-level coding standard job analysis process 1100, which may be performed at design time, i.e., prior to the designed job being executed for purposes of data integration. In operation 1102, coding criteria are loaded from the job-level coding standard in the analytical rules stored in DIAD 220. In operation 1104, the selected job design is compiled and, in operation 1106, the job model produced by way of compiling the job design is stored in metadata repository 210. In operation 1108, the job model is evaluated against the coding criteria retrieved from the job-level coding standard. In operation 1110, a coding standard score is computed, such as described above and, in operation 1112, the computed score is stored as job analysis results in DIAD 220. In operation 1114, the analysis results are incorporated into the job compilation report. In operation 1116, it is determined whether the job compilation report contains any warnings. If so, the job designer may correct the job code using, among other things, the coding standard analysis data contained in the job compilation report; otherwise process 1100 terminates. Once the designer has made corrections, process 1100 returns to operation 1104, by which the corrected job code is recompiled and process 1100 is repeated from that point.

Figure 12:
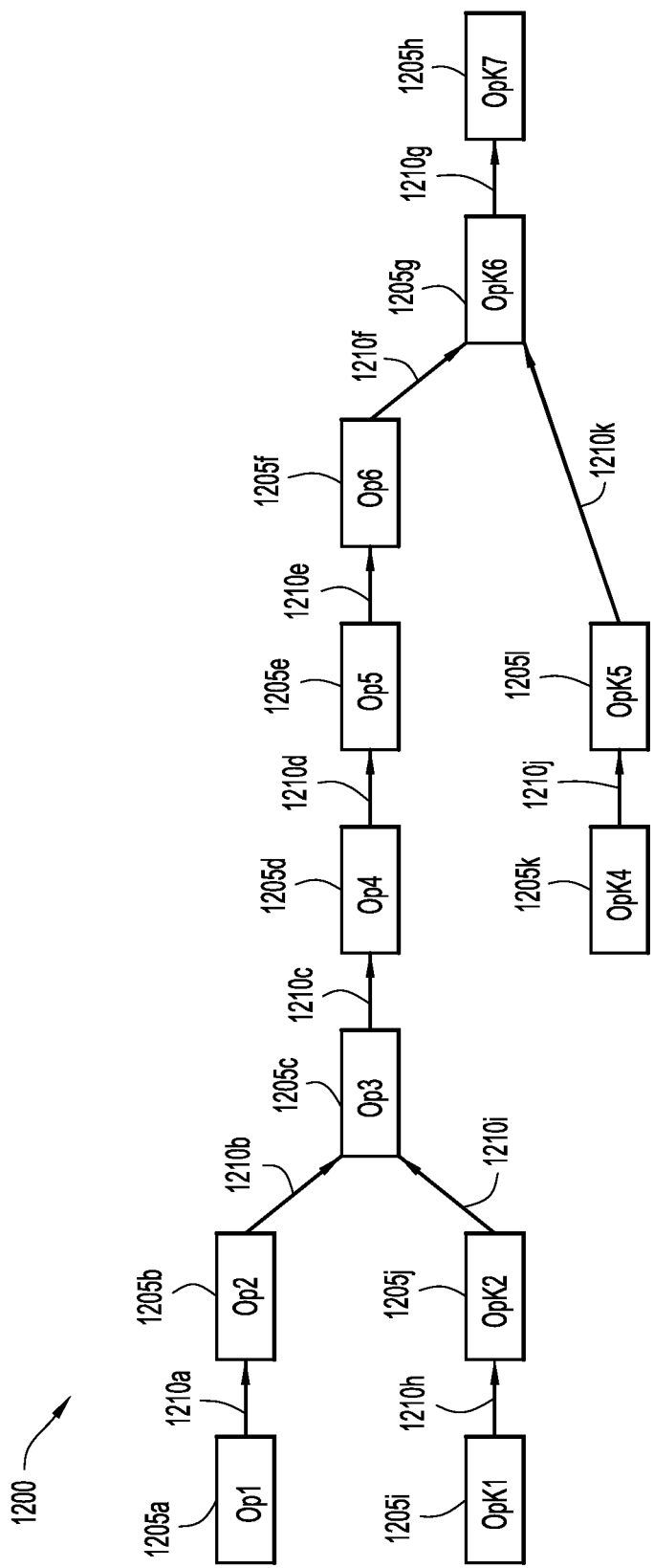
FIG. 12 is an illustration of a job tree that can be implemented in embodiments of the present general inventive concept.

As stated above, users may want to know which jobs, if any, that were derived from a job template contain a defect. FIG. 12 is an illustration of a job tree 1200 illustrating such a case. The user can select a job tree feature implemented in JDAS 127—one of the job correlation features, to trace which jobs have been developed based on the same template. The job graph correlation coefficient rule may be used by JDAS 127 in this case. Job graph representation focuses on stages 1205a-1205l, representatively referred to herein as stage(s) 1205, and how they are connected with links 1210a-1210k, representatively referred to herein as link(s) 1210. Job graph correlation is determined by comparing a job flow graph against the flow graph of a given job template. A flow graph consists of groups of stages 1205, one branch per group. Groups for job tree 1200 may be represented as follows:

Group 1: Op1, Op2, Op3, Op4, Op5, Op6, OpK6, OpK7
Group2: OpK1, OpK2, Op3, Op4, Op5, Op6, OpK6, OpK7
Group 3: OpK4, OpK5, OpK6, OpK7

Data analytics processor 410 may retrieve jobs from metadata repository 210, compare job graphs of those jobs against the job graph of the template, calculate job graph correlation coefficients, and generate the report. As an example, it is to be assumed that N is the number of groups in a template, M is the number of groups in a job. Mi and Ni may be compared to It may be determined whether two groups contain the same stages by comparing $m_i$ ($1 \le i \le M$) and $n_j$ ($1 \le j \le N$). If K is assumed as the number of groups that are identical to groups in the template, K/N may be the job graph correlation coefficient which indicates how close the job design relates to the template. A user can further analyze non-identical groups to add weight to job graph correlation coefficient if the group contains some additionally inserted stages. For example, it is to be noted that there is OpK56 between OpK5 and OpK6 in group 3. This group contributes to the job graph correlation coefficient by 4 (identical stages)/5 (identical stages+one inserted) percent. Similarly, for any given job graph, the user can trace what other jobs are derived and evolved from that given job.

Figure 13:
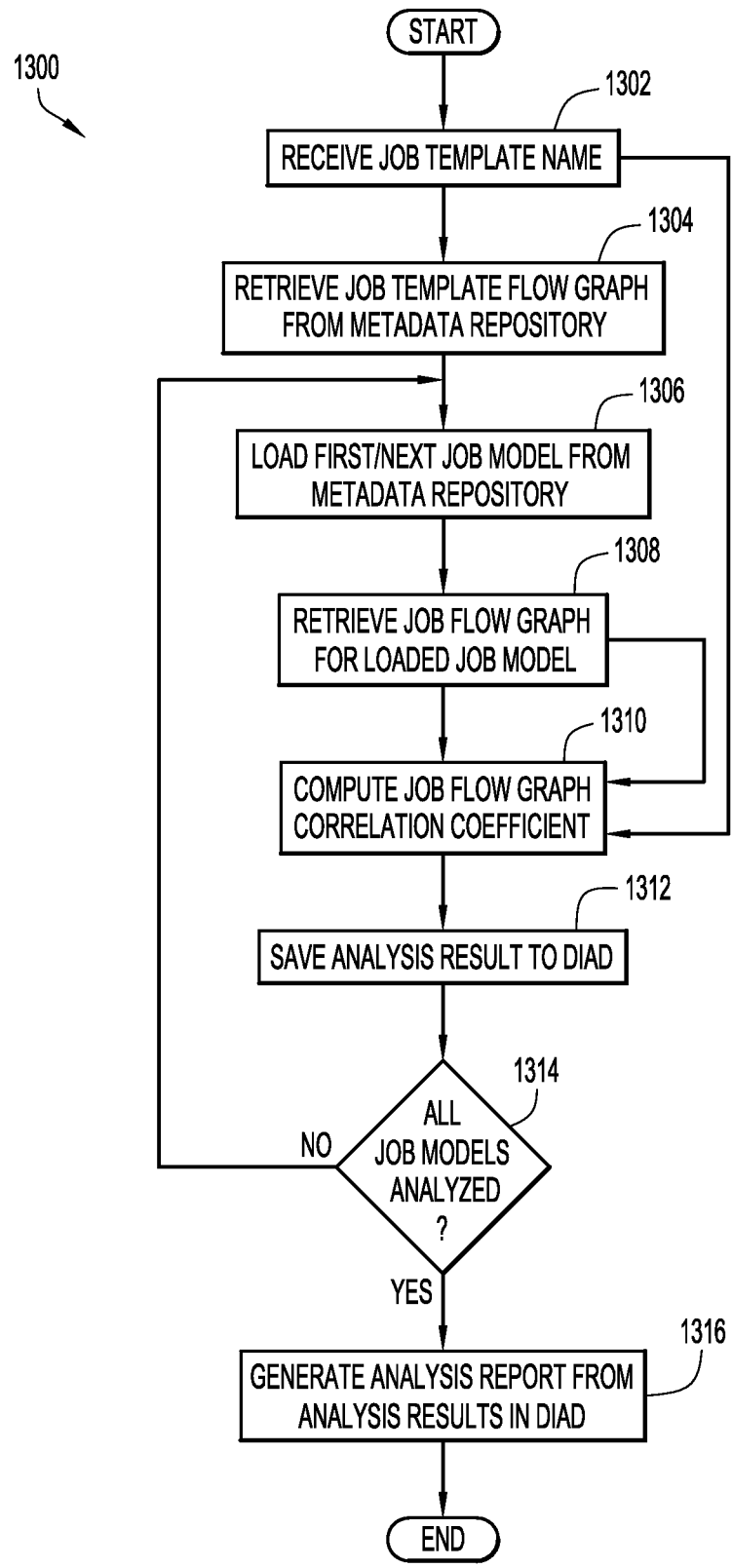
FIG. 13 is a flow chart of an exemplary job graph correlation coefficient rule process that can be implemented in embodiments of the present general inventive concept.

FIG. 13 is a flow chart of an exemplary job graph correlation coefficient rule process 1300. In operation 1302, a job template name is received, such as through job analytics interface 244. In operation 1304, the named job template is retrieved from metadata repository 210 and, in operation 1306, a first job model is loaded from metadata repository 210. In operation 1308, a job flow graph is retrieved for the loaded job model and, in operation 1310, a job graph correlation coefficient is computed the between flow graph of the job model and the flow graph retrieved from the job template, such as described above. In operation 1312, the computed correlation coefficient is stored as job analysis results in DIAD 220. In operation 1314, it is determined whether all job models have been analyzed against the job graph correlation coefficient rule. If so, process 1300 may transition to operation 1316, by which an analysis report is generated from the analysis results stored in DIAD 220; otherwise, the analysis of process 1300 continues to the next job model, which is loaded in operation 1306.

The present invention adds analytics support to a data integration environment so as to provide the user a broad view of information on job design artifacts, help obtain deep insights into the actions that build and maintain efficient, productive, and resilient data integration applications. The present invention presents the user an analytical system which can be integrated with the job design environment or can be run as a service provider to generate job analysis reports when needed. The user can select analytics features for a particular need on a regular scheduled basis per job level, project level, engine wide, or per user and user group etc. Depending on the analytics features enabled, the analysis report can provide a comprehensive view on design style, design artifacts, best practices, job correlation, and backward compatibility. The user can follow the report and turn the insight into action by fixing any new or potential issues as early as possible.

The present invention adds analytics to job design. The advantage of this solution is that job analysis is embedded within the design process, so that the user can be aware of any new issues firsthand and turn that information into action as early as possible.

The present invention can be configured to help enforce design style and best practices standards, relieving the user from the mechanic and manual process, and improving the productivity.

The present invention can be used to identify ripple effect type of problems. This is helpful especially for jobs with inner dependencies and for jobs impacted by changes in behavior introduced in a new release. The user is able to estimate the level of impact that a new release may impose as well as the scope and effort to upgrade to the new release.

The analytics features can evolve with product releases. Features are pluggable, can be enabled or disabled, can be removed from the analytical system when they are no longer relevant.

The analytical system makes the design environment transparent to the system administrator who can maintain quality standards with clear action plans.

It will be appreciated that the embodiments described above and illustrated in the drawings represent only a few of the many ways of implementing embodiments for a job design analytical system.

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser software, communications software, server software, etc. These systems may include any types of monitors and input devices (e.g., keyboard, mouse, voice recognition, etc.) to enter and/or view information.

It is to be understood that the software (e.g.,) of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments (e.g., job modeling engine 250, job analytics interface 244, notice analysis engine 320, feature extraction engine 412, feature extraction plugins 413, analytical rule engine 414, job model API 432/415, criteria analyzer 416, reporting engine 418, data integration data integration analytic database 220, etc.) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g. job models 215, job design metadata 213, analytical rules 224, FeatureExtraction.xml 325, analysis results 228, etc.). The databases may be included within or coupled to the server and/or client systems. The databases and/or storage structures may be remote from or local to the computer or other processing systems, and may store any desired data (e.g. job models 215, job design metadata 213, analytical rules 224, FeatureExtraction.xml 325, analysis results 228, etc.).

The present invention embodiments may employ any number of any type of user interface (e.g., Graphical User Interface (GUI), command-line, prompt, etc.) for obtaining or providing information (e.g., features to extract, analytical rules, etc.), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The report may include any information arranged in any fashion, and may be configurable based on rules or other criteria to provide desired information to a user (e.g., job analytical rules, severity criteria, job features, etc.).

The present invention embodiments are not limited to the specific tasks or algorithms described above, but may be utilized for job design analytics.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A system for analyzing a data integration job performed by a computer system, the system comprising:
a processor configured to:
receive a request for analysis of a data integration job, wherein the request includes one or more features and criteria for the analysis; and
extract each feature from a job model representing the data integration job independently of executing the data integration job by invoking a corresponding analytical rule for each feature, wherein the analytical rule includes one or more operations and invoking the corresponding analytical rule includes:
performing the operations of the corresponding analytical rule to analyze one or more job components associated with the corresponding feature as represented in the job model and to extract information pertaining to that feature.

2. The system of claim 1, wherein the processor is further configured to:
generate a report for the request including information pertaining to one or more extracted features.

3. The system of claim 1, wherein the processor, in extracting each feature, is further configured to:
determine a presence of that feature within the job model.

4. The system of claim 1, wherein the processor, in extracting each feature, is further configured to:
verify that feature for compliance with one or more conditions.

5. The system of claim 1, wherein at least one analytical rule extracts one or more features from the job model pertaining to an impact to the job components from one or more changes to the data integration job.

6. The system of claim 1, wherein at least one analytical rule extracts one or more features pertaining to at least one of data type identification, a coding standard, relation to other jobs, and identification of one or more jobs developed from a common template.

7. A computer program product for analyzing a data integration job performed by a computer system, comprising a computer-readable storage medium having computer-readable program code embodied thereon, the computer-readable program code, when executed by a processor, causes the processor to:
receive a request for analysis of a data integration job, wherein the request includes one or more features and criteria for the analysis; and
extract each feature from a job model representing the data integration job independently of executing the data integration job by invoking a corresponding analytical rule for each feature, wherein the analytical rule includes one or more operations and invoking a corresponding analytical rule includes:
performing the operations of the corresponding analytical rule to analyze one or more job components associated with the corresponding feature as represented in the job model and to extract information pertaining to that feature.

8. The computer program product of claim 7, the computer-readable program code being further configured to cause the processor to:
generate a report for the request including information pertaining to one or more extracted features.

9. The computer program product of claim 7, the computer-readable program code that causes the processor to extract each feature being further configured to cause the processor to:
determine a presence of that feature within the job model.

10. The computer program product of claim 7, the computer-readable program code that causes the processor to extract each feature being further configured to cause the processor to:
verify that feature for compliance with one or more conditions.

11. The computer program product of claim 7, wherein at least one analytical rule extracts one or more features from the job model pertaining to an impact to the job components from one or more changes to the data integration job.

12. The computer program product of claim 7, wherein at least one analytical rule extracts one or more features pertaining to at least one of data type identification, a coding standard, relation to other jobs, and identification of one or more jobs developed from a common template.

* * * * *